(12) United States Patent
Ooyoshi et al.

(10) Patent No.: US 6,463,037 B1
(45) Date of Patent: Oct. 8, 2002

(54) LOOPING DETECTION APPARATUS

(75) Inventors: Akitsugu Ooyoshi; Nobuo Shirai, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/167,262

(22) Filed: Oct. 7, 1998

(30) Foreign Application Priority Data

Mar. 3, 1998 (JP) ............................................ 10-050340

(51) Int. Cl.⁷ .................................................. H04J 1/16

(52) U.S. Cl. ........................... 370/242; 370/249; 714/25

(58) Field of Search ................................ 370/249, 241, 370/242, 244, 245, 247, 248; 714/100, 25

(56) References Cited

U.S. PATENT DOCUMENTS 5,166,923 A * 11/1992 Ohmori et al.
5,659,540 A * 8/1997 Chen et al.
5,854,816 A * 12/1998 Kim et al.

FOREIGN PATENT DOCUMENTS

| JP | 7-221792 | 8/1995 |
| JP | 8-018564 | 1/1996 |

* cited by examiner

Primary Examiner—Melvin Marcelo
Assistant Examiner—Inder Pal Mehra
(74) Attorney, Agent, or Firm—Katten Muchin Zavis Rosenman

(57) ABSTRACT

A looping detection apparatus used in a frame-relay communications system and capable of detecting looping without fail through confirmation of link completeness according to a two-way PVC status confirmation procedure. A status enquiry message transmitting unit transmits a status enquiry message with a first identification code carried at a predetermined position of a signal by means of which the status enquiry message is transmitted. On receiving the status enquiry message, a status response message returning unit creates a status response message based on the status enquiry message and sends the status response message back to a first node with a second identification code carried at the predetermined position. When a status enquiry message is received, a judging unit checks the code carried at the predetermined position to determine whether or not a loop has occurred in the channel between the first and second nodes, and judges that a loop has occurred in the channel if the received message carries the first identification code.

18 Claims, 16 Drawing Sheets

| | 8 | 7 | 6 | 5 | 4 | 3 | 2 | 1 | |
|---|---|---|---|---|---|---|---|---|---|
| | | | HIGH-ORDER DLCI | | | | C/R | EA | OCTET 1 |
| | LOW-ORDER DLCI | | | | FECN | BECN | DE | EA | OCTET 2 |

DLCI : DATA LINK CONNECTION IDENTIFIER

C/R : COMMAND/RESPONSE INDICATION BIT

FECN : FORWARD EXPLICIT CONGESTION NOTIFICATION BIT

BECN : BACKWARD EXPLICIT CONGESTION NOTIFICATION BIT

DE : DISCARD ENABLE INDICATION BIT

EA : ADDRESS FIELD EXTENSION BIT
  OCTET 1: 0 FIXED
  OCTET 2: 1 FIXED

FIG. 3

LOOPING DETECTION APPARATUS

BACKGROUND OF THE INVENTION (1) Field of the Invention

The present invention relates to a looping detection apparatus, and more particularly, to a looping detection apparatus for a communications system in which a node transmits a status enquiry message to a remote node and, when a status enquiry message is received from the remote node, sends back a status response message, to thereby confirm whether normal communication status is established with the remote node.

The present invention is applied in particular to a frame-relay communications system and utilizes the PVC (Permanent Virtual Circuit) status confirmation procedure as specified in the recommendations X.76 by the ITU-T (International Telecommunication Union-Telecommunication Sector) to detect looping caused between nodes.

(2) Description of the Related Art

Frame relay is conventionally known as a communications technique capable of achieving high-speed, low-delay communications required for communications between LANs, and at present, there already exist a large number of public and private frame-relay networks. As a protocol (NNI: Network-Network Interface) to be used in such frame-relay networks, the ITU-T recommendations X.76 have been standardized.

According to the ITU-T recommendations X.76, two-way procedure (technique according to which one node carries out both status enquiry and status response) is defined as the PVC status confirmation procedure, and when there has occurred a fault in a trunk line (including a fault of a sending line only and a fault of a receiving line only) of the frame-relay network, error is detected through confirmation of link completeness.

The following is an outline of the link completeness confirmation according to the PVC status confirmation procedure as provided by the ITU-T recommendations X.76.

The PVC status confirmation procedure employs periodic polling to confirm link completeness and to make a notification of PVC status. In the two-way PVC status confirmation procedure, a polling start procedure and a polling response procedure described below are executed by each node.

FIG. 15 is a diagram illustrating the polling start procedure and the polling response procedure. Assuming in FIG. 15 that each node comprises STE (Signaling Terminal Equipment), an SE (Status Enquiry) message for making an enquiry about status and an ST (Status) message, which is a status response to the enquiry message, are exchanged between STEa and STEb.

In the polling start procedure, the STE periodically generates an SE message, transmits the same to a remote STE, and on receiving from the remote STE an ST message responsive to the SE message, performs a receiving process. The SE message is generated at intervals of, for example, 10 seconds, and an SE-F message of which the report type is full status is generated in a ratio of once to six message generations.

In the polling response procedure, on receiving an SE message, the STE generates an ST message responsive to the SE message, and sends the ST message back to that STE which transmitted the SE message. In response to the SE-F message, an ST-F message whose report type is full status is transmitted. If there has been a change in the status of the STE, the STE may transmit an ST-F message in response to an SE message.

In the following, explanation is made basically of the SE message and the ST message, and operations unique to the SE-F message and the ST-F message will be explained separately where appropriate.

The link completeness confirmation is made by using these messages, and to this end, each STE is provided with two storage sections PI and PR. Each of the storage sections PI and PR is configured so as to store sequence numbers V(S) and V(R). Also, each of the SE message and the ST message is formatted such that it has a part for carrying two sequence numbers N(S) and N(R).

When an SE message is transmitted from a local STE, the sequence number N(S) carried by this SE message is copied to the storage section PI of the local STE as the sequence number V(S). Similarly, when an ST message is transmitted from a local STE, the sequence number N(S) carried by this ST message is copied to the storage section PR of the local STE as the sequence number V(S).

When a local STE has received an ST message, the sequence number N(S) carried by this ST message is copied to the storage section PI of the local STE as the sequence number V(R). Further, when this local STE transmits an SE message next time, the sequence number V(R) in the storage section PI is used as the sequence number N(R) to be carried by the SE message. Similarly, when a local STE has received an SE message, the sequence number N(S) carried by this SE message is copied to the storage section PR of the local STE as the sequence number V(R). Further, when this local STE transmits an ST message next time, the sequence number V(R) in the storage section PR is used as the sequence number N(R) to be carried by the ST message.

Explanation will be now made with reference to a specific example shown in FIG. 15.

First, it is assumed that the sequence numbers V(S) and V(R) in the storage section PI of the STEb are set to values a and b, respectively, and that the sequence numbers V(S) and V(R) in the storage section PR of the STEb are set to values x and y, respectively. Thus, the sequence numbers V(S) and V(R) in the storage section PI of the STEa are set to the values y and x, respectively, and the sequence numbers V(S) and V(R) in the storage section PR of the STEa are set to the values b and a, respectively.

When polling timing for the STEb is reached and an SE message is to be transmitted to the STEa, the sequence number V(S) in the storage section PI of the STEb, that is, a, is read out, and a value (a+1), which is the sum of the read value and the value "1," is set as the sequence number N(S) of the SE message. Also, the sequence number V(R) in the storage section PI, that is, b, is read out and set as the sequence number N(R) of the SE message. The SE message having the sequence numbers N(S) and N(R) thus set therein is transmitted to the STEa, and at the same time the sequence number N(S) set in this SE message, that is, (a+1), is copied to the storage section PI of the STEb as the sequence number V(S).

On receiving the SE message, the STEa compares the value of the sequence number N(R) carried by the SE message with the value of the sequence number V(S) in the storage section PR thereof. In the illustrated example, both take the value b, and when the two values coincide in this manner, the STEa judges that there is no abnormality in the channel between the STEa and the STEb. When no abnormality is detected, the value (a+1) of the sequence number N(S) carried by the SE message is set as the sequence number V(R) of the storage section PR. Then, the sequence number V(S) in the storage section PR of the STEa, that is, b, is read out, and a value (b+1), which is the sum of the read value and the value "1," is set as the sequence number N(S) of an ST message. Also, the sequence number V(R) in the storage section PR, that is, a+1, is read out and set as the sequence number N(R) of the ST message. The ST message having the sequence numbers N(S) and N(R) thus set therein is transmitted to the STEb, and at the same time the sequence number N(S) set in this ST message is copied to the storage section PR of the STEa as the sequence number V(S).

If the value of the sequence number N(R) carried by the received SE message is different from the value of the sequence number V(S) in the storage section PR, the STEa judges that the channel between the STEa and the STEb is abnormal. In this case, the value of the sequence number V(S) in the storage section PR is retained as it is, and the value of the sequence number N(S) carried by the SE message is set as the sequence number V(R) of the storage section PR. Further, the sequence number V(S) in the storage section PR of the STEa is read out, and a value obtained by adding the value "1" to the read value is set as the sequence number N(S) of an ST message. Also, the sequence number V(R) in the storage section PR is read out and set as the sequence number N(R) of the ST message. The ST message having the sequence numbers N(S) and N(R) thus set therein is transmitted to the STEb, and at the same time the sequence number N(S) set in this ST message is copied to the storage section PR of the STEa as the sequence number V(S).

On receiving the ST message, the STEb compares the value of the sequence number N(R) carried by the ST message with the value of the sequence number V(S) in the storage section PI thereof. In the illustrated example, both take the value (a+1), and when the two values coincide in this manner, the STEb judges that there is no abnormality in the channel between the STEa and the STEb. When no abnormality is detected, the value (b+1) of the sequence number N(S) carried by the ST message is set as the sequence number V(R) of the storage section PI.

If the value of the sequence number N(R) carried by the received ST message differs from the value of the sequence number V(S) in the storage section PI, the STEb judges that the channel between the STEa and the STEb is abnormal. In this case, the ST message is discarded, the sequence numbers V(S) and V(R) in the storage section PI are retained at the same values as before the discard of the ST message, and the STEb waits until polling timing for transmitting the next SE message is reached.

When polling timing for the STEa is reached and an SE message is to be transmitted to the STEb, the sequence number V(S) in the storage section PI of the STEa, that is, y, is read out, and a value (y+1), which is the sum of the read value and the value "1," is set as the sequence number N(S) of the SE message. Also, the sequence number V(R) in the storage section PI, that is, x, is read out and set as the sequence number N(R) of the SE message. The SE message having the sequence numbers N(S) and N(R) thus set therein is transmitted to the STEb, and at the same time the sequence number N(S) set in this SE message, that is, (y+1), is copied to the storage section PI of the STEa as the sequence number V(S).

On receiving the SE message, the STEb compares the value of the sequence number N(R) carried by the SE message with the value of the sequence number V(S) in the storage section PR thereof. In the illustrated example, both take the value x, and when the two values coincide in this manner, the STEb judges that there is no abnormality in the channel between the STEa and the STEb. When no abnormality is detected, the value (y+1) of the sequence number N(S) carried by the SE message is set as the sequence number V(R) of the storage section PR. Then, the sequence number V(S) in the storage section PR of the STEb, that is, x, is read out, and a value (x+1), which is the sum of the read value and the value "1," is set as the sequence number N(S) of an ST message. Also, the sequence number V(R) in the storage section PR, that is, y+1, is read out and set as the sequence number N(R) of the ST message. The ST message having the sequence numbers N(S) and N(R) thus set therein is transmitted to the STEa, and at the same time the sequence number N(S) set in this ST message is copied to the storage section PR of the STEb as the sequence number V(S).

The STEa, on receiving the ST message, compares the value of the sequence number N(R) carried by the ST message with the value of the sequence number V(S) in the storage section PI thereof. In the illustrated example, both take the value (y+1), and when the two values coincide in this manner, the STEa judges that there is no abnormality in the channel between the STEa and the STEb. When no abnormality is detected, the value (x+1) of the sequence number N(S) carried by the ST message is set as the sequence number V(R) of the storage section PI.

Even in the event that the channel between the STEa and the STEb is judged to be abnormal, a final judgment that the channel is abnormal is made only when the abnormality is detected three times in four consecutive confirmations of link completeness, for example, thereby avoiding erroneous judgment.

In cases where a loop is created in the channel between the STEa and the STEb due to an error in working process or the like, however, a problem arises in that, although there is abnormality to be detected, the channel is not finally judged to be abnormal. This will be explained with reference to FIG. 16.

FIG. 16 is a diagram showing a sequence of link completeness confirmations made in the case where a loop is created in the channel between the STEa and the STEb. It is assumed in FIG. 16 that the STEa and the STEb are connected to each other by NNI according to the ITU-T recommendations X.76, and that the STEb and DTEb (Data Terminal Equipment b) are connected to each other by UNI (User Network Interface) according to the ITU-T recommendations X.36.

If a loop is created in the channel between the STEa and the STEb, an SE message [N(S)=a+2; N(R)=b+1] transmitted from the STEb and directed to the STEa, for example, loops back (R1 in FIG. 16) and is received by the STEb as an SE message transmitted from the STEa. The STEb starts the polling response procedure on receiving the SE message, and since the value (b+1) of the sequence number N(R) carried by the SE message is different from the value (x+1) of the sequence number V(S) in the storage section PR, the difference is counted as the first detection of abnormality during the polling response procedure. In this case, the sequence number N(S) of the SE message, that is, a+2, is set as the sequence number V(R) in the storage section PR of the STEb. Then, a value (x+2) obtained by adding the value "1" to the value x+1 of the sequence number V(S) in the storage section PR is set as the sequence number N(S) of an ST message, and the value a+2 of the sequence number V(R) in the storage section PR is set as the sequence number N(R)

of the ST message, the ST message being transmitted to the STEa (R2 in FIG. 16).

However, this ST message also loops directly back to the STEb (R3 in FIG. 16) and is received by the STEb as an ST message transmitted from the STEa, so that the polling start procedure is initiated. The STEb compares the value of the sequence number N(R) carried by the ST message with the value of the sequence number V(S) in the storage section PI thereof. In the illustrated case, both take the value (a+2), and the STEb judges that there is no abnormality in the channel between the STEa and the STEb, though the polling start procedure should originally make the first detection of abnormality. In FIG. 16, the circle indicates the case where it is judged that there is no abnormality, and the dark circle indicates the case where it is judged that there is abnormality.

When the timing for transmitting an SE message from the STEb is reached thereafter, an SE message [N(S)=a+3; N(R)=x+2] directed to the STEa is transmitted in the polling start procedure. If there still exits a loop, this SE message loops back directly (R4 in FIG. 16) and is received by the STEb as an SE message transmitted from the STEa.

On receiving the SE message, the STEb starts the polling response procedure and compares the value of the sequence number N(R) carried by the SE message with the value of the sequence number V(S) in the storage section PR thereof. In the illustrated case, both take the value (x+2), and therefore, although the polling response procedure should originally make the second detection of abnormality, the STEb judges that there is no abnormality in the channel between the STEa and the STEb.

The STEb thereafter sets the sequence number N(S) of the SE message, that is, a+3, as the sequence number V(R) in the storage section PR thereof. Also, a value (x+3) obtained by adding the value "1" to the value x+2 of the sequence number V(S) in the storage section PR is set as the sequence number N(S) of an ST message, and the sequence number V(R) in the storage section PR, that is, a+3, is set as the sequence number N(R) of the ST message, the ST message being transmitted to the STEa (R5 in FIG. 16).

This ST message also loops directly back to the STEb (R6 in FIG. 16) and is received by the STEb as an ST message transmitted from the STEa, so that the polling start procedure is initiated. The STEb compares the value of the sequence number N(R) carried by the ST message with the value of the sequence number V(S) in the storage section PI thereof. In the illustrated case, both take the value (a+3), and the STEb judges that there is no abnormality in the channel between the STEa and the STEb, though the polling start procedure should originally make the second detection of abnormality.

Similarly, in the subsequent polling response and start procedures, abnormality of the channel fails to be detected.

Thus, based on an SE message transmitted from the STEb immediately after the occurrence of looping of the channel, the STEb detects abnormality of the channel in the polling response procedure, but it is judged thereafter that there is no abnormality in the channel, though a loop has occurred in the channel. Consequently, with a method in which a final judgment that there exists abnormality is made only when the abnormality is detected three times in four consecutive confirmations of link completeness in either the polling start or response procedure, it is not possible to detect a channel loop.

Since a loop of the channel between the STEa and the STEb cannot be detected though it actually exists, transmission of a user frame from the DTEb to the STEb cannot be prevented, causing a communication fault (R7 in FIG. 16).

This problem arises not only in the case of frame-relay NNI but also in the case of employing a two-way procedure in frame-relay UNI as the PVC status confirmation procedure.

SUMMARY OF THE INVENTION

An object of the present invention is to provide a looping detection apparatus capable of detecting looping without fail through link completeness confirmation according to a two-way PVC status confirmation procedure.

To achieve the above object, there is provided a looping detection apparatus for a communications system in which a node transmits a status enquiry message to a remote node and, when a status enquiry message is received from the remote node, sends back a status response message, to thereby confirm whether normal communication status is established with the remote node. The looping detection apparatus comprises status enquiry message transmitting means provided in a first node, for transmitting a status enquiry message to a second node with a first identification code carried at a predetermined position of a signal by means of which the status enquiry message is transmitted, status response message returning means provided in the second node, for creating a status response message based on the status enquiry message upon receipt of same, and sending the status response message back to the first node with a second identification code carried at the predetermined position in place of the first identification code, and judging means provided in the first node, for checking the code carried at the predetermined position of a signal by means of which a status enquiry message has been transmitted when the status enquiry message is received, and judging that abnormality has occurred in communication status between the second and local nodes if the signal carries the first identification code.

To achieve the above object, there is also provided a looping detection apparatus for a communications system in which a node transmits a status enquiry message to a remote node and, when a status enquiry message is received from the remote node, sends back a status response message, to thereby confirm whether normal communication status is established with the remote node. The looping detection apparatus comprises status enquiry message transmitting means for transmitting a status enquiry message to a remote node with first and second values carried at first and second predetermined positions, respectively, of the status enquiry message, the status enquiry message transmitting means having a first storage section for storing the first and second values and a second storage section for storing third and fourth values, first reading means for reading out the values carried at the first and second predetermined positions of a status enquiry message when the status enquiry message is received, first judging means for comparing the two values read out by the first reading means with corresponding ones of the two values stored in the first storage section and judging that abnormality has occurred in communication status between the remote and local nodes if the former two values coincide with the corresponding ones of the latter two values, first storage instructing means for causing the second storage section to store, as a fifth value in place of the fourth value, the value carried at the first predetermined position of the received status enquiry message when a judgment that abnormality has occurred in the communication status is made by the first judging means, status response message transmitting means for transmitting a status response message to the remote node, the status response message having a third predetermined position carrying a sixth value obtained by adding a value of 1 to the third value stored in the second storage section and a fourth predetermined position carrying the fifth value stored in the second storage section, second storage instructing means for causing the second storage section to store, in place of the third value, the value carried at the third predetermined position of the status response message transmitted by the status response message transmitting means, and third storage instructing means for causing the first storage section to store, in place of the first value, a seventh value obtained by adding a predetermined value to the first value stored therein.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram showing the format of a frame which a frame-relay exchange processing section transmits and receives;

DESCRIPTION OF THE PREFERRED EMBODIMENTS

Embodiments of the present invention will be hereinafter described with reference to the drawings.

Figure 1:
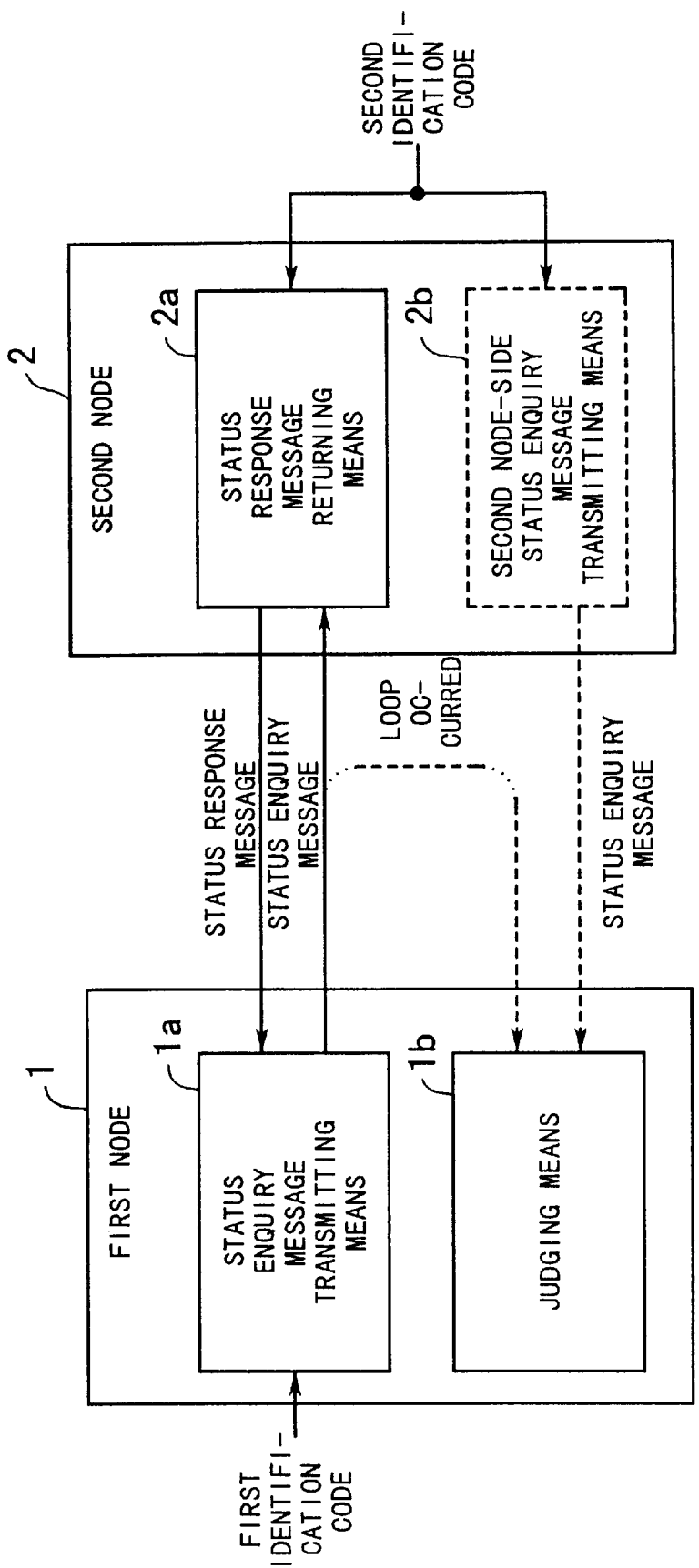
FIG. 1 is a block diagram illustrating the principles of the present invention.

Referring first to FIG. 1, a theoretical configuration according to a first embodiment will be explained. The first embodiment comprises status enquiry message transmitting means 1a provided in a first node 1, for transmitting a status enquiry message to a second node 2 with a first identification code carried at a predetermined position of a signal by means of which the status enquiry message is transmitted, status response message returning means 2a provided in the second node 2, for creating a status response message based on the status enquiry message upon receipt of same, and sending the status response message back to the first node 1 with a second identification code carried at the predetermined position in place of the first identification code, and judging means 1b provided in the first node 1, for checking the code carried at the predetermined position of a signal by means of which a status enquiry message has been transmitted when the status enquiry message is received, and judging that abnormality has occurred in communication status between the second node 2 and the local node 1 if the signal carries the first identification code.

With the above configuration, in a normal state free of loop, the status enquiry message transmitting means 1a provided in the first node 1 transmits a status enquiry message to the second node 2 with the first identification code carried at the predetermined position of a signal by means of which the status enquiry message is transmitted. On receiving the status enquiry message, the status response message returning means 2a of the second node 2 creates a status response message based on the received status enquiry message, and sends the status response message back to the first node 1 with the second identification code carried at the predetermined position in place of the first identification code.

Since the procedure employed is a two-way PVC status confirmation procedure, the first and second nodes 1 and 2 have an identical arrangement. Namely, the second node 2 also has means corresponding to the status enquiry message transmitting means 1a of the first node, and this means is illustrated in FIG. 1 as second node-side status enquiry message transmitting means 2b. A status enquiry message is transmitted also from the second node-side status enquiry message transmitting means 2b to the first node 1 at polling timing independent of that of the status enquiry message transmitting means 1a of the first node.

Here let it be assumed that a loop has occurred in the channel between the first and second nodes 1 and 2. In this case, the status enquiry message transmitted from the status enquiry message transmitting means 1a of the first node 1 and directed to the second node 2 returns to the first node 1. In order to discriminate the status enquiry message looped back in this manner from that transmitted from the second node-side status enquiry message transmitting means 2b, when a status enquiry message is received, the judging means 1b provided in the first node 1 checks the code carried at the predetermined position of the signal by means of which the received status enquiry message has been transmitted. If the first identification code is carried at the predetermined position, then it means that the received status enquiry message was transmitted from the local node 1 but looped back, and thus it can be concluded that abnormality has occurred in the communication status between the second node 2 and the local node 1. If, on the other hand, the second identification code is carried at the predetermined position, it means that the received status enquiry message was transmitted from the second node 2, and it can therefore be concluded that the communication status between the second node 2 and the local node 1 is normal.

Consequently, looping can be detected without fail through link completeness confirmation according to the two-way PVC status confirmation procedure.

The first embodiment will be now described in more detail.

Figure 2:
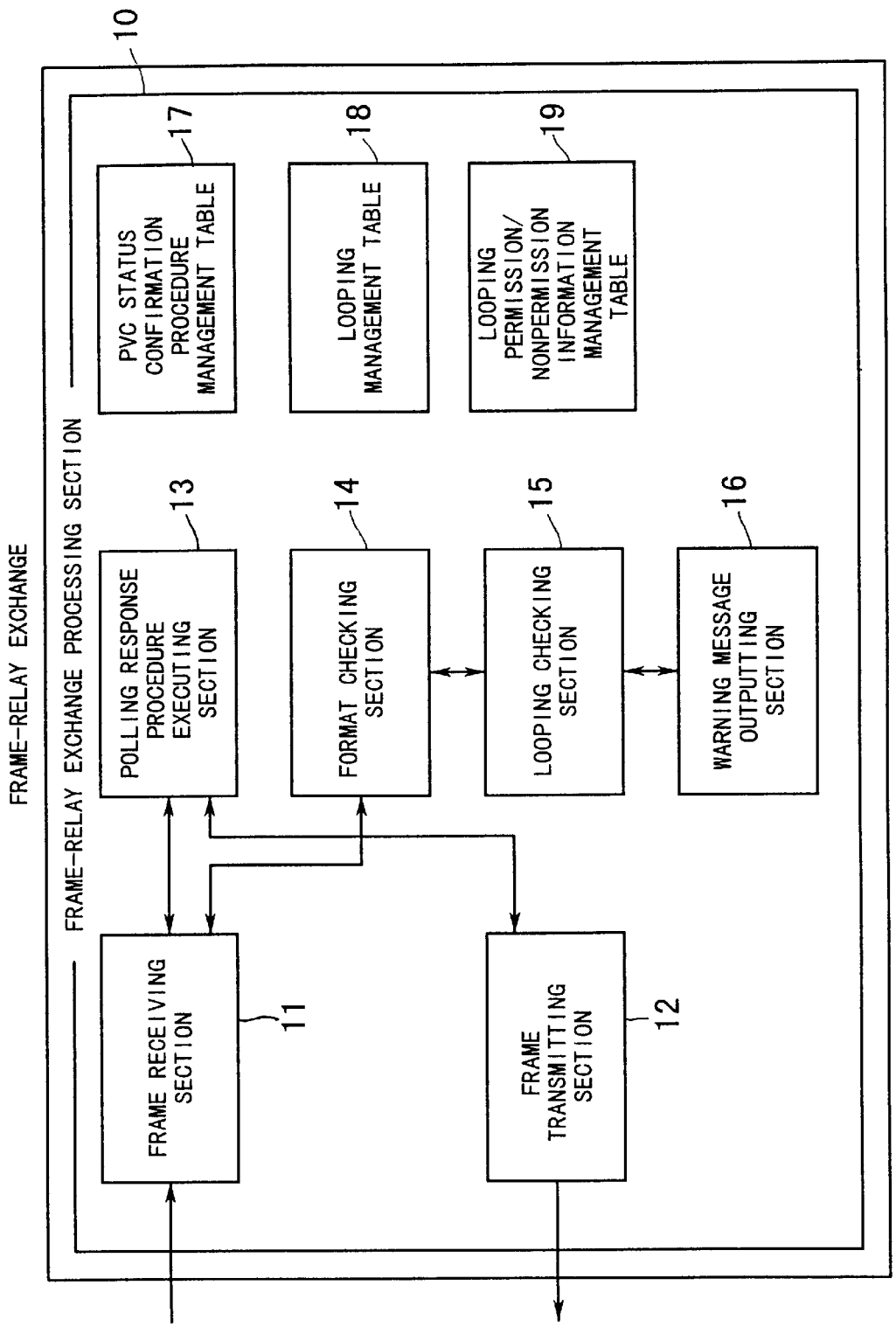
FIG. 2 is a block diagram showing the configuration of a frame-relay exchange including a looping detection apparatus according to the present invention.

FIG. 2 is a block diagram showing the configuration of a frame-relay exchange including a looping detection apparatus according to the present invention. It is assumed that the frame-relay exchange employs a two-way PVC status confirmation procedure complying with frame-relay UNI/NNI. Note that FIG. 2 illustrates only a part of the frame-relay exchange that relates to the present invention.

Specifically, a frame-relay exchange processing section 10 comprises a data processing system including a CPU (Central Processing Unit), ROM (Read-Only Memory), RAM (Random Access Memory), input/output devices, etc., and has, as functions achieved by the data processing system, a frame receiving section 11, a frame transmitting section 12, a polling response procedure executing section 13, a format checking section 14, a looping checking section 15, and a warning message outputting section 16. The data processing system also incorporates therein a PVC status confirmation procedure management table 17, a looping management table 18, and a looping permission/nonpermission information management table 19.

Prior to the explanation of the individual functions, the format of a frame which the frame-relay exchange processing section 10 transmits and receives and the individual tables will be explained.

FIG. 3 is a diagram showing the format of a frame which the frame-relay exchange processing section 10 transmits and receives. This frame format is defined by the ITU-T recommendations Q.922, and FIG. 3 shows only a DL core which is a header of the frame.

In cases where the frame is used for the purpose of transmission of messages according to the PVC status confirmation procedure, the value "0" is set in each field of DLCI, FECN, BECN and DE. The messages for the PVC status confirmation procedure include an SE (Status Enquiry) message for status enquiry and an ST (STatus) message which is a status response to the enquiry message.

In the case of transmitting a message according to the PVC status confirmation procedure, the C/R (Command/Response) field is used to specify the source of the message transmitted according to the PVC status confirmation procedure. Specifically, where PVC status confirmation procedure-related messages are exchanged between two STEs, one STE sets the value "0" in the C/R field when transmitting a message according to the PVC status confirmation procedure, and the other STE sets the value "1" in the C/R field when transmitting a message according to the PVC status confirmation procedure.

Although not shown in FIG. 3, an information field of the frame, by means of which a PVC status confirmation procedure-related message is transmitted, carries sequence numbers N(S) and N(R).

Figure 4:
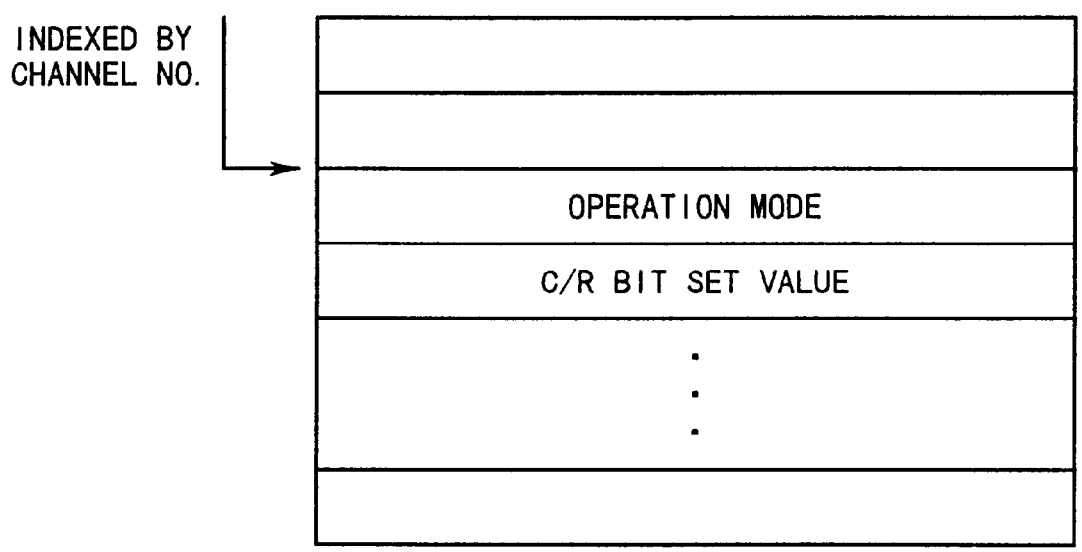
FIG. 4 is a diagram showing the arrangement of a PVC status confirmation procedure management table.

FIG. 4 is a diagram showing the arrangement of the PVC status confirmation procedure management table 17. This table has an operation mode field and a C/R bit set value field assigned to each of channel numbers, and in each operation mode field is described an operation mode of the PVC status confirmation procedure for a corresponding channel. The operation mode includes three modes, that is, two-way mode, DTE mode, and DCE mode. The two-way mode is a mode in which both polling start and response procedures are executed, the DTE mode is a mode in which the polling start procedure alone is executed, and the DCE mode is a mode in which the polling response procedure alone is executed.

Figure 13:
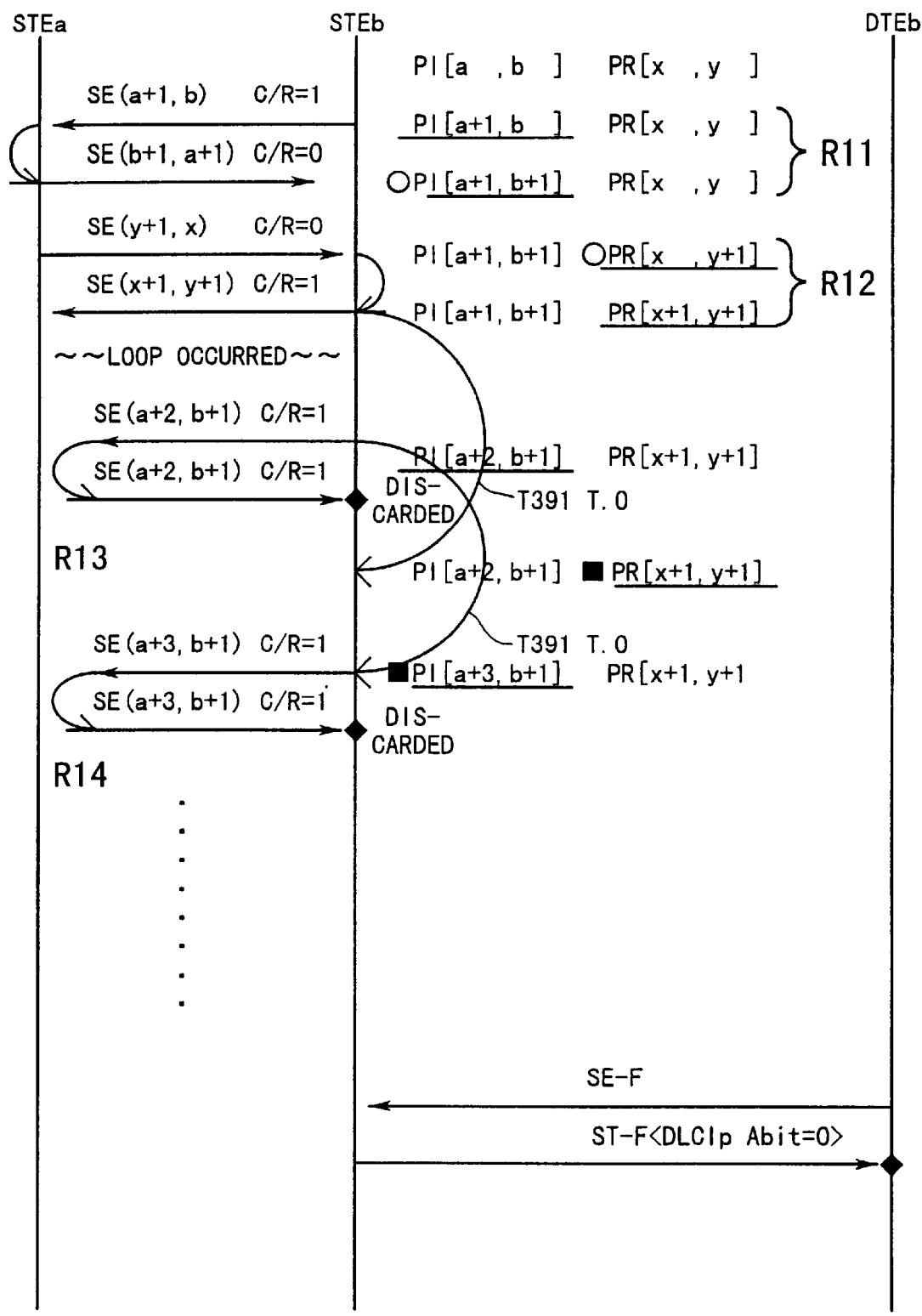
FIG. 13 is a diagram showing a sequence of operations of a node STEb in particular when polling start and response procedures are executed between nodes STEa, STEb and DTEb according to a first embodiment.

When transmitting a message according to the PVC status confirmation procedure, the local STE writes, in the C/R bit set value field, the value set in the C/R field of a frame by means of which the message is transmitted. This field is valid only when the two-way mode is set in the operation mode field. In FIG. 13 described later, for example, an STEb employs the two-way mode as the operation mode of the PVC status confirmation procedure for the channel connected to an STEa, and "1" is set in the C/R bit set value field.

Figure 5:
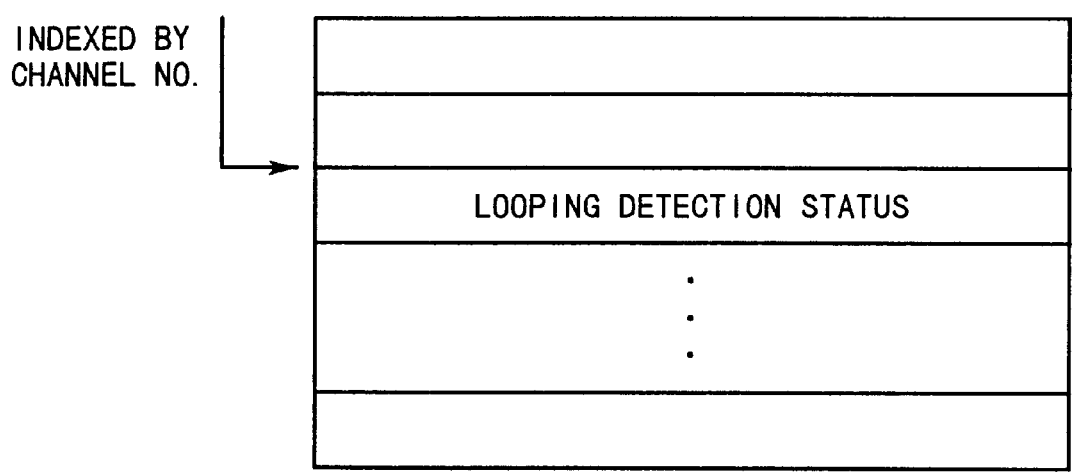
FIG. 5 is a diagram showing the arrangement of a looping management table.

FIG. 5 is a diagram showing the arrangement of the looping management table 18. This table has a looping detection status field for each channel number, and in this field is described whether or not a loop is being detected in a corresponding channel.

Figure 6:
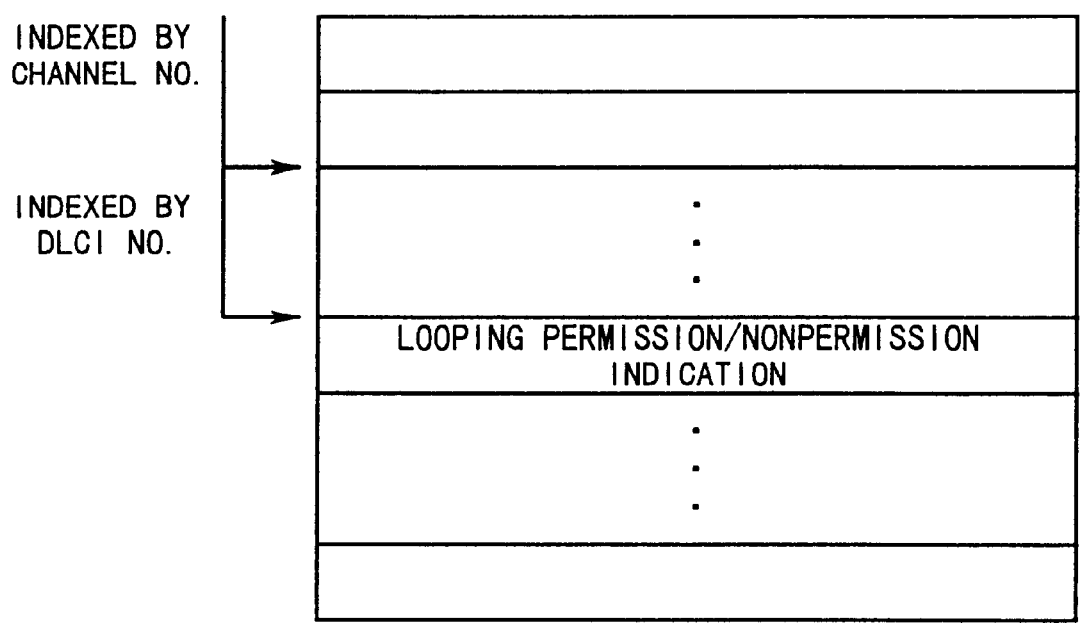
FIG. 6 is a diagram showing the arrangement of a looping permission/nonpermission information management table.

FIG. 6 is a diagram showing the arrangement of the looping permission/nonpermission information management table 19. This table has a looping permission/nonpermission indication field associated not only with each channel number but also with each DLCI (Data Link Connection Identifier) number, and even while looping is detected in a corresponding channel, whether or not a frame may be transmitted via a link with a corresponding DLCI number is described in this field. This table provides an advantageous effect during traffic test, as described in detail later.

Referring now to FIGS. 7 through 12, the processes of the frame receiving section 11, the frame transmitting section 12, the polling response procedure executing section 13, the format checking section 14, the looping checking section 15 and the warning message outputting section 16 will be described.

Figure 7:
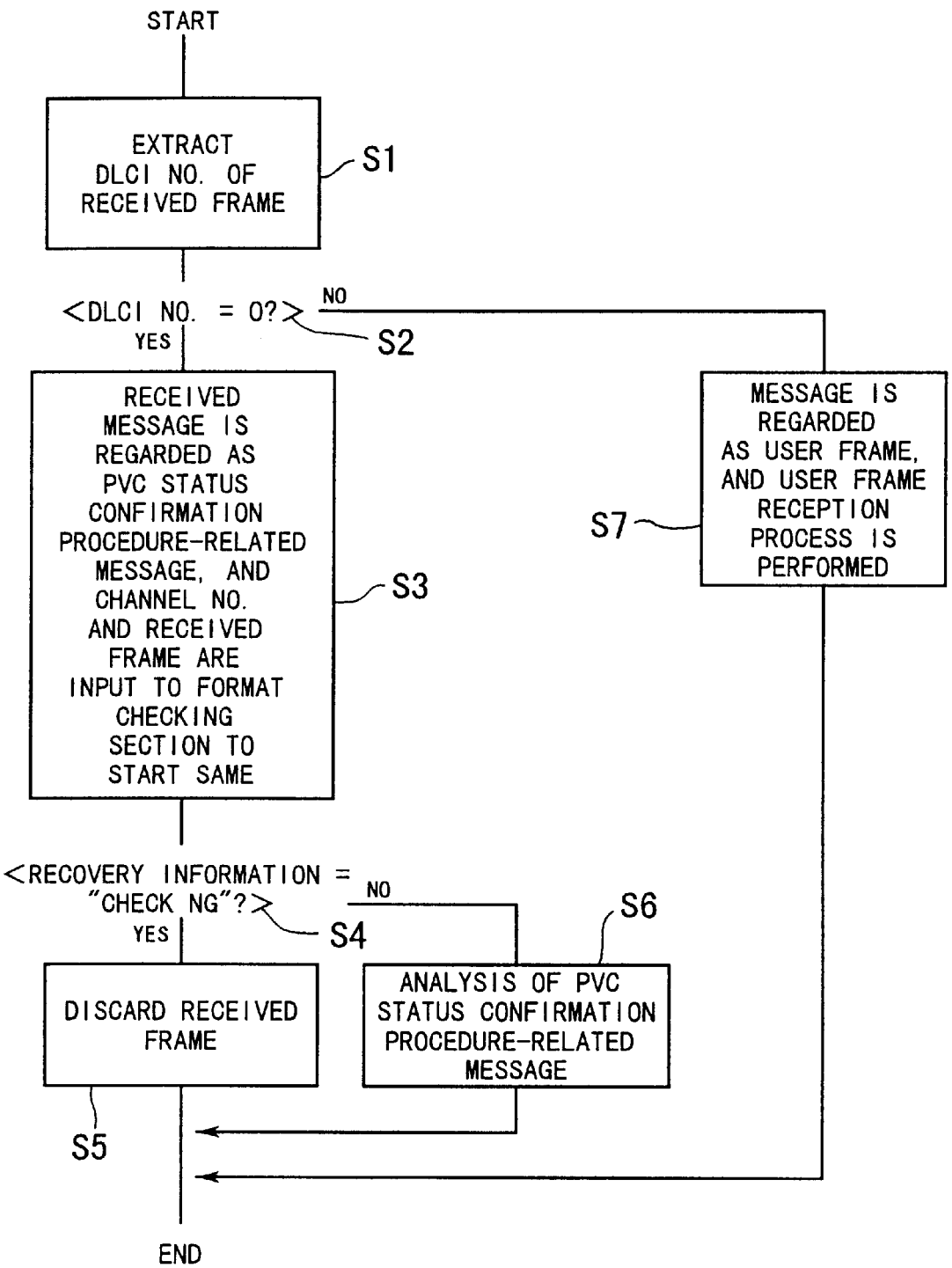
FIG. 7 is a flowchart showing a procedure of a frame receiving section.

FIG. 7 is a flowchart showing the procedure of the frame receiving section 11. In the following explanation, step numbers (S) shown in FIG. 7 are referred to where appropriate.

When a frame is received from a channel, the frame receiving section 11 extracts the number described in the DLCI field in the received frame (S1), and if the extracted number is "0," it judges that the received frame contains a message relating to the PVC status confirmation procedure (S2). The frame receiving section 11 then transfers only the frame of the PVC status confirmation procedure-related message to the format checking section 14 together with the channel number of the channel via which the frame has been received, to thereby start the format checking section 14 (S3). If "check NG" is set as recovery information in the subsequent process of the format checking section 14, the frame receiving section 11 discards the received frame (S4, S5), and if "check NG" is not set as the recovery information, then the received frame is analyzed as to the PVC status confirmation (S4, S6). If the DLCI number is found to be a number other than "0" in Step S2, it is judged that the received frame is a user frame, and a user frame reception process is performed (S7).

Figure 8:
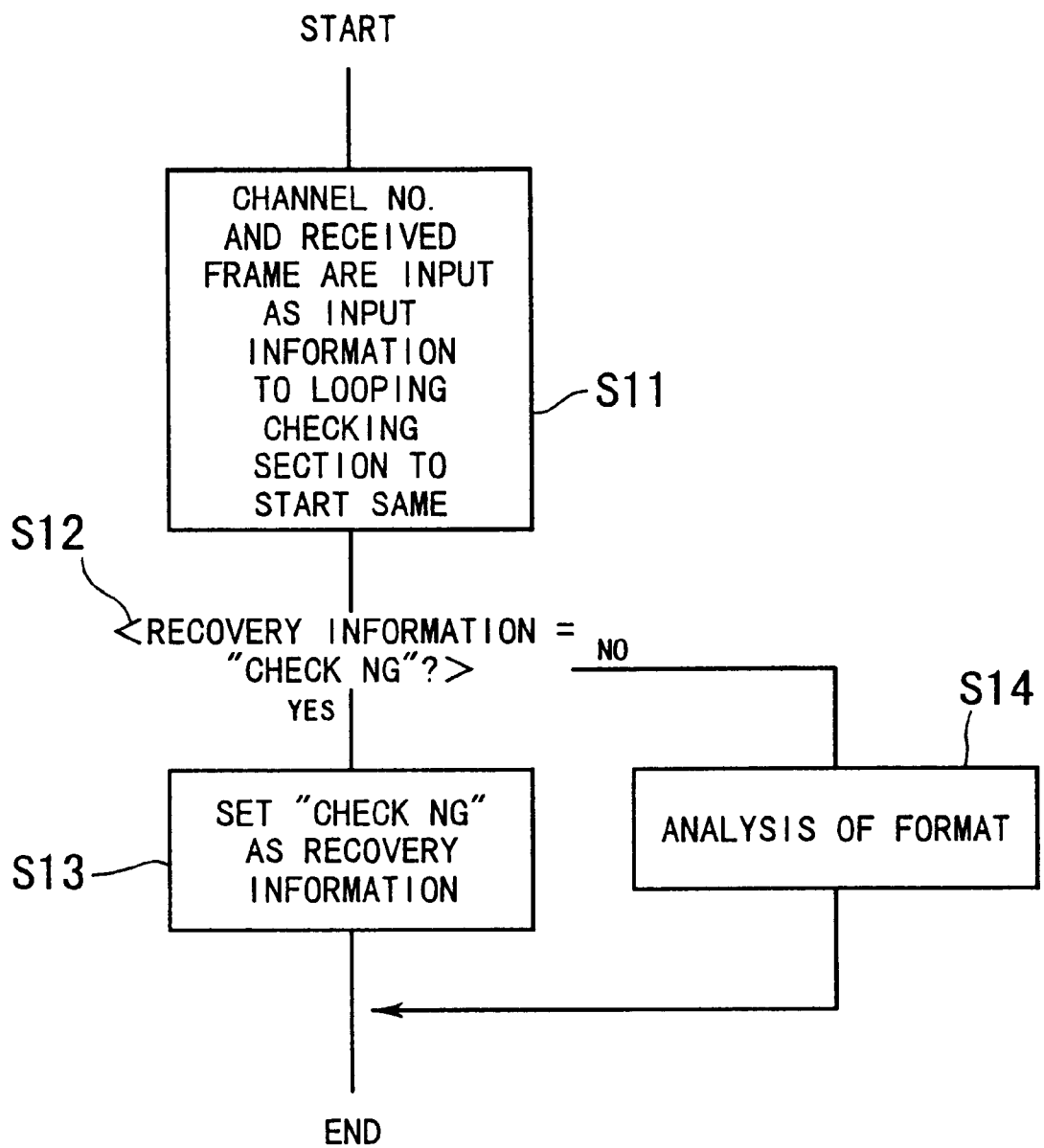
FIG. 8 is a flowchart showing a procedure of a format checking section.

FIG. 8 is a flowchart showing the procedure of the format checking section 14. In the following explanation, step numbers (S) shown in FIG. 8 are referred to where appropriate.

On receiving the channel number and the received frame from the frame receiving section 11, the format checking section 14 sends the received data to the looping checking section 15 to start the same (S11). If the recovery information is judged to be "check NG" in the subsequent process of the looping checking section 15, the format checking section 14 sets "check NG" as the recovery information for the frame received by the frame receiving section 11 (S12, S13). If the recovery information is not judged to be "check NG," the format checking section 14 analyzes the format of the received frame (S12, S14).

Figure 9:
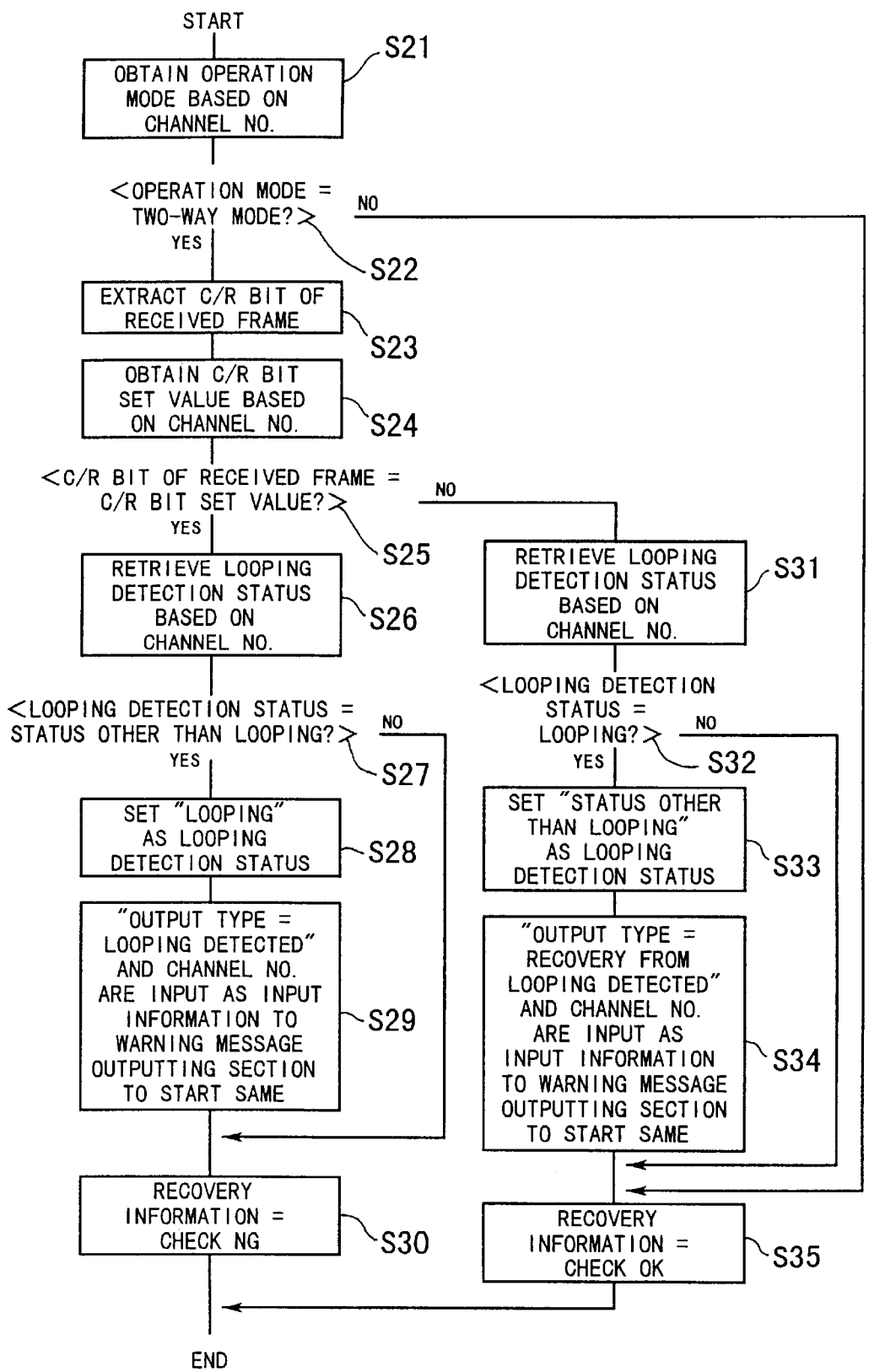
FIG. 9 is a flowchart showing a procedure of a looping checking section.

FIG. 9 is a flowchart showing the procedure of the looping checking section 15. In the following explanation, step numbers (S) shown in FIG. 9 are referred to where appropriate.

Referring to the status confirmation procedure management table 17 (FIG. 4), the looping checking section 15 determines the operation mode set with respect to the channel number sent from the format checking section 14 (S21). If the operation mode is the two-way mode, the value in the C/R field of the received frame sent from the format checking section 14 is extracted (S22, S23). Then, referring to the status confirmation procedure management table 17 (FIG. 4), a C/R set value set with respect to the channel number sent from the format checking section 14 is determined (S24). If the value in the C/R field extracted in Step S23 is different from the C/R set value obtained in Step S24, it is judged that there is no abnormality in the channel, and if the two coincide, it is judged that looping has occurred (S25). This will be explained more specifically with reference to FIG. 13.

FIG. 13 is a diagram showing a sequence of operations of a node STEb in particular when the polling start and response procedures are executed between nodes STEa, STEb and DTEb.

First, it is assumed that sequence numbers V(S) and V(R) in a storage section PI of the STEb are set to values a and b, respectively, and that sequence numbers V(S) and V(R) in a storage section PR of the STEb are set to values x and y, respectively. Thus, the sequence numbers V(S) and V(R) in the storage section PI of the STEa are set to values y and x, respectively, and the sequence numbers V(S) and V(R) in the storage section PR of the STEa are set to values b and a, respectively.

When polling timing for the STEb is reached and an SE message is to be transmitted to the STEa, as indicated at R11 in FIG. 13, the sequence number V(S) in the storage section PI of the STEb, that is, a, is read out, and a value (a+1), which is the sum of the read value and the value "1," is set as the sequence number N(S) of the SE message. Also, the sequence number V(R) in the storage section PI, that is, b, is read out and set as the sequence number N(R) of the SE message. When transmitting the SE message having the sequence numbers N(S) and N(R) thus set therein by means of a frame, a value to be set in the C/R field of the frame is obtained from the status confirmation procedure management table (value=1), the obtained value "1" is set in the C/R field, and the frame is transmitted to the STEa.

At this time, the sequence number N(S) set in the SE message, that is, (a+1), is copied to the storage section PI of the STEb as the sequence number V(S).

If there is no loop occurring, the STEa creates an ST message upon receipt of the SE message and sends the same back to the STEb. In the ST message, b+1 and a+1 are respectively set as the sequence numbers N(S) and N(R) in accordance with the conventional procedure, and the value "0" is set in the C/R field of a new frame by means of which the ST message is transmitted.

On receiving the ST message, the STEb compares the value of the sequence number N(R) carried by the ST message with the value of the sequence number V(S) in the storage section PI thereof. Further, the STEb compares the value in the C/R field carried by the received frame with the C/R set value stored in its own status confirmation procedure management table 17. If the two sequence numbers are found to be the same as a result of the former comparison and at the same time the two C/R values are found to be different from each other as a result of the latter comparison, it is judged that there is no abnormality in the channel between the STEa and the STEb; otherwise, it is judged that abnormality has occurred in the channel between the STEa and the STEb. In the illustrated example, the sequence numbers both take the same value (a+1) and the two C/R values are different from each other, and thus the STEb judges that there is no abnormality in the channel between the STEa and the STEb. When no abnormality is detected in this manner, the value (b+1) of the sequence number N(S) carried by the ST message is set as the sequence number V(R) of the storage section PI (R11).

If, on the other hand, a frame having the value "0" set in its C/R field and carrying an SE message in which y+1 and x are set as the sequence numbers N(S) and N(R), respectively, is transmitted to the STEb, as indicated at R12 in FIG. 13, the STEb compares the value of the sequence number N(R) carried by the SE message with the value of the sequence number V(S) in the storage section PR thereof. Further, the STEb compares the value in the C/R field carried by the received frame with the C/R set value stored in its own status confirmation procedure management table 17. Also in this case, if the two sequence numbers are found to be the same as a result of the former comparison and at the same time the two C/R values are found to be different from each other as a result of the latter comparison, it is judged that there is no abnormality in the channel between the STEa and the STEb; otherwise, it is judged that abnormality has occurred in the channel between the STEa and the STEb. According to the conventional procedure, even in the case where the two sequence numbers are found to be different from each other as a result of the former comparison and thus it is judged that abnormality has occurred in the channel, an ST message is created and transmitted. By contrast, according to the present invention, when the two sequence numbers are found to be different from each other as a result of the former comparison and at the same time the two C/R values are found to be the same as a result of the latter comparison, the SE message is discarded and no ST message is created or transmitted.

In the illustrated example, the sequence numbers both take the same value x and the C/R values are different from each other; therefore, the STEb judges that there is no abnormality in the channel between the STEa and the STEb. When no abnormality is detected in this manner, the STEb sets the value (y+1) of the sequence number N(S) carried by the SE message in its storage section PR as the sequence number V(R). Then, the sequence number V(S) in the storage section PR of the STEb, that is, x, is read out, and a value (x+1), which is the sum of the read value and the value "1," is set as the sequence number N(S) of an ST message. Also, the sequence number V(R) in the storage section PR, that is, y+1, is read out and set as the sequence number N(R) of the ST message. Further, the value "1" is set in the C/R field of a frame by means of which the ST message having the sequence numbers N(S) and N(R) thus set therein is to be transmitted, and then the frame is transmitted to the STEa. In this case, the sequence number N(S) set in this ST message, that is, x+1, is copied to the storage section PR of the STEb as the sequence number V(S).

Let it here be assumed that a loop has been created in the channel between the STEa and the STEb. In this case, a frame transmitted from the STEb to the STEa, for example, which frame carries an SE message [N(S)=a+2; N(R)=b+1] and has the value "1" set in its C/R field, directly loops back, as indicated at R13 in FIG. 13, and the STEb receives this message as an SE message transmitted from the STEa. The polling response procedure is started in the STEb, but since the C/R values are the same, the received SE message is discarded and no ST message is created or transmitted.

Figure 16:
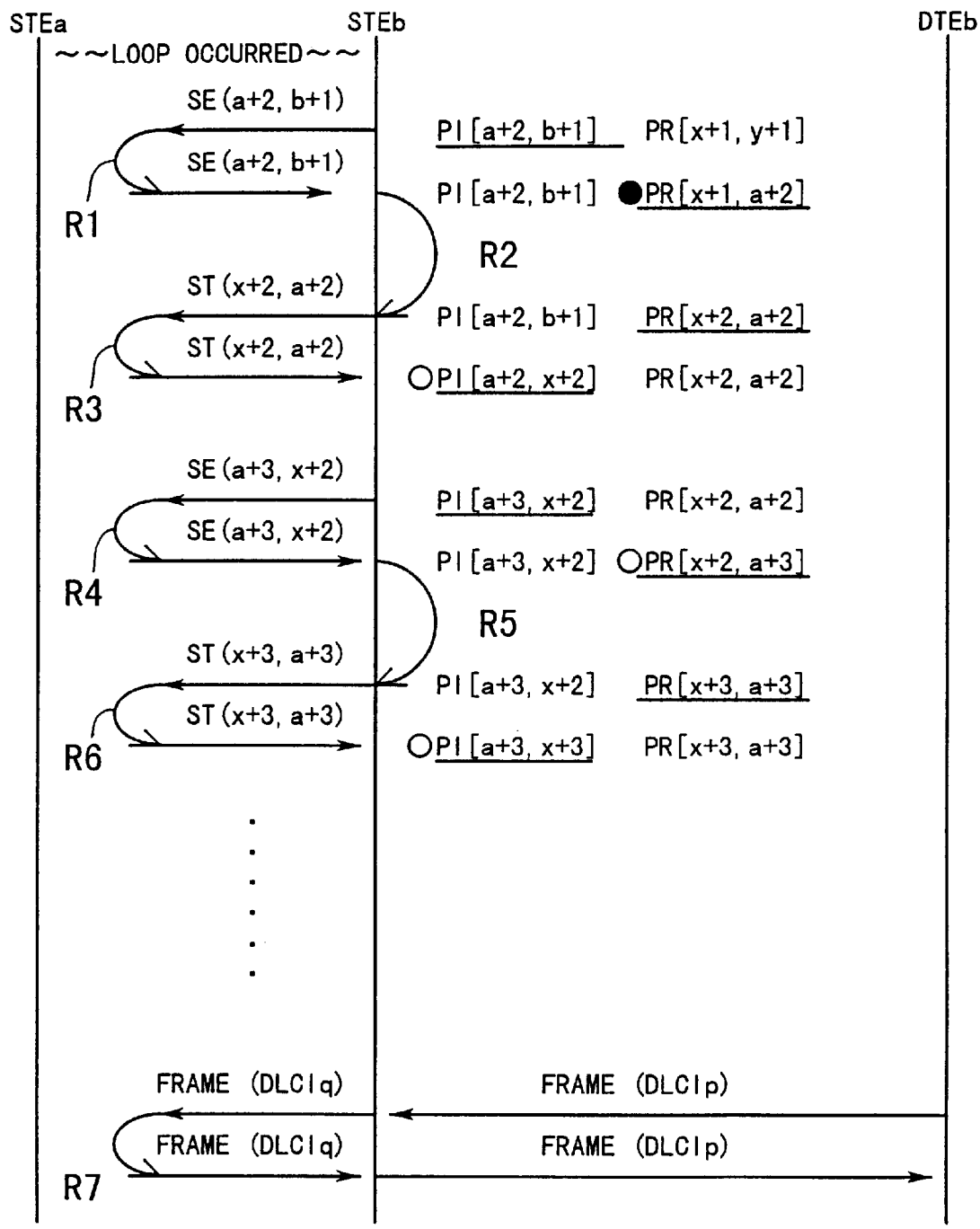
FIG. 16 is a diagram showing a sequence of conventional link completeness confirmations made when a loop exists in the channel between the STEa and the STEb.

Namely, according to the conventional procedure, an ST message is transmitted to the STEa as indicated at R2 in FIG. 16, but this ST message directly loops back as indicated at R3 in FIG. 16, with the result that the STEb makes an erroneous judgment that the channel is in a normal state. Such an erroneous judgment is never made in the present invention. The "abnormality in the channel" mentioned herein denotes looping of the channel.

Referring again to FIG. 9, the looping checking section 15 refers to the looping management table 18 (FIG. 5) to retrieve the looping detection status corresponding to the channel number (S26). If the retrieved looping detection status indicates "status other than looping," it is judged that a transition from "status other than looping" to "looping" has occurred; therefore, "looping" is set in the looping management table 18 as the corresponding looping detection status (S27, S28), and "output type=looping detected" and the channel number are sent to the warning message outputting section 16 to start the same (S29). A judgment is then made that the recovery information should be "check NG," and the format checking section 14 is notified of this judgment (S30).

If it is judged in Step S25 that the value in the C/R field extracted in Step S23 differs from the C/R set value obtained in Step S24, it is judged that there is no abnormality in the channel, and the looping checking section 15 refers to the looping management table 18 (FIG. 5) to retrieve the looping detection status corresponding to the channel number (S31). Then, if the retrieved looping detection status indicates "looping," it is judged that a transition from "looping" to "status other than looping" has occurred; therefore, "status other than looping" is set in the looping management table 18 as the corresponding looping detection status (S32, S33), and "output type=recovery from looping detected" and the channel number are sent to the warning message outputting section 16 to start the same (S34). A judgment is then made that the recovery information should be "check OK," and the format checking section 14 is notified of this judgment (S35).

Figure 10:
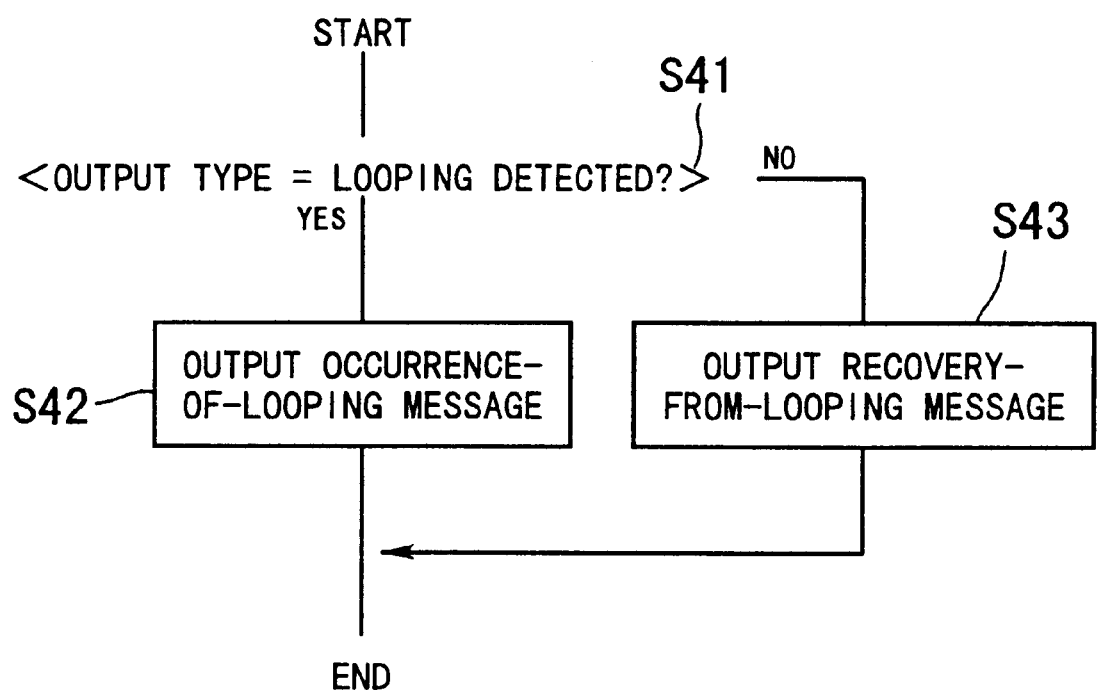
FIG. 10 is a flowchart showing a procedure of a warning message outputting section.

FIG. 10 is a flowchart showing the procedure of the warning message outputting section 16. In the following explanation, step numbers (S) shown in FIG. 10 are referred to where appropriate.

If the output type is "looping detected," the warning message outputting section 16 outputs an message notifying the operator that looping has occurred (S41, S42), and if the output type is "recovery from looping detected," the warning message outputting section 16 outputs a message notifying the operator of recovery from looping (S41, S43).

Figure 11:
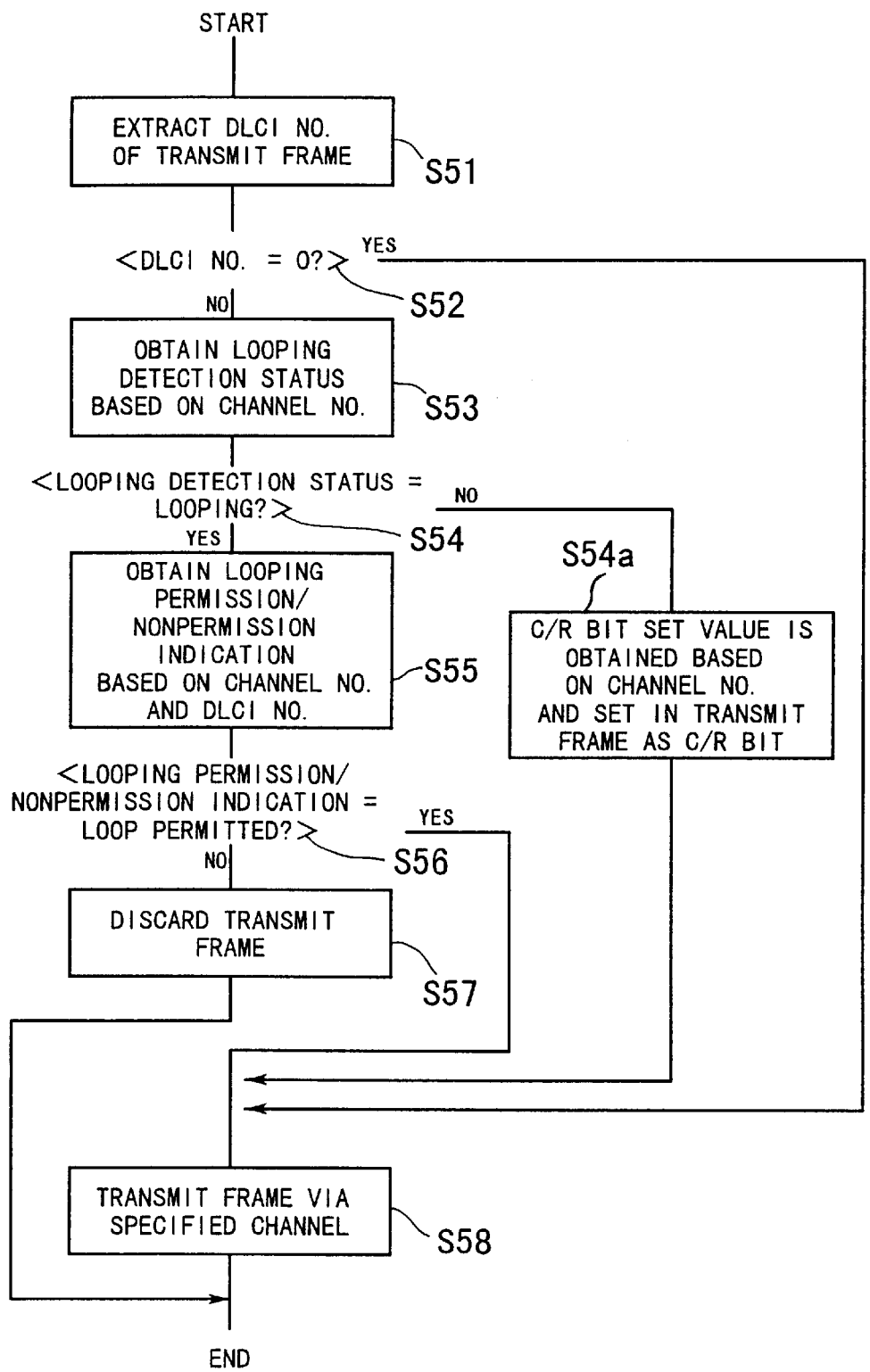
FIG. 11 is a flowchart showing a procedure of a frame transmitting section.

FIG. 11 is a flowchart showing the procedure of the frame transmitting section 12. In the following explanation, step numbers (S) shown in FIG. 11 are referred to where appropriate.

When a frame is to be transmitted to a channel, the frame transmitting section 12 extracts the DLCI number of the transmit frame (S51). If the DLCI number takes a value other than "0," that is, if the transmit frame is a user frame which does not contain a PVC status confirmation procedure-related message, the looping management table 18 (FIG. 5) is referred to and the looping detection status corresponding to the number of the channel via which the transmit frame is to be transmitted is obtained (S52, S53). If the obtained looping detection status indicates "looping," reference is further made to the looping permission/nonpermission information management table 19 (FIG. 6) to obtain a looping permission/nonpermission indication corresponding to the number of the channel via which the transmit frame is to be transmitted as well as to the DLCI number of the transmit frame (S54, S55). If the looping permission/nonpermission indication thus obtained is "loop permitted," the frame is transmitted via this channel (S56, S58). If the obtained looping permission/nonpermission indication is "loop nonpermitted," the transmit frame is discarded (S56, S57). If, on the other hand, it is judged in Step S52 that the DLCI number is "0," that is, the transmit frame is a frame containing a PVC status confirmation procedure-related message, the frame is transmitted via the channel as specified (S58). If, in Step S54, it is judged that the looping detection status is not "looping," a C/R bit set value corresponding to the number of the channel via which the frame is to be transmitted, shown in FIG. 4, is obtained and set in the transmit frame as the C/R bit (S54a), and the frame is transmitted via the channel (S58).

As seen from Steps S56 and S57 described above, if the looping permission/nonpermission indication is "loop permitted," a user frame is transmitted even while looping is detected. This is because, when looping of a channel is intentionally caused for the purpose of traffic test, no problem arises if user frames are transmitted as usual and thus the operator sets "loop permitted" as the looping permission/nonpermission indication. In such cases, even while looping is detected, transmission of user frames is permitted for the DLCI specified by the operator.

Figure 12:
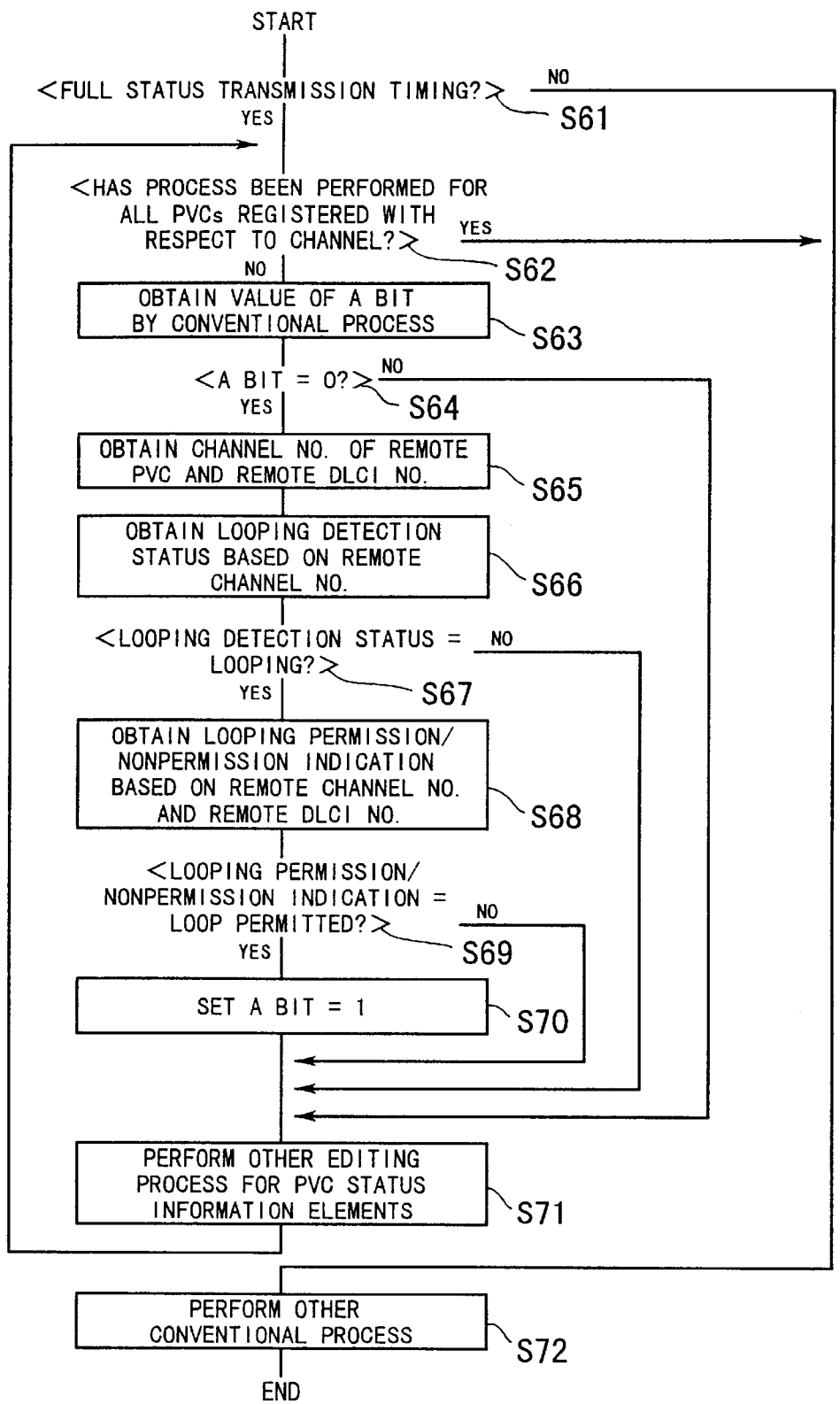
FIG. 12 is a flowchart showing a procedure of a polling response procedure executing section.

FIG. 12 is a flowchart showing the procedure of the polling response procedure executing section 13 which is started, for example, when the STEb receives an SE or SE-F message from the DTEb as shown in FIG. 13. In the following explanation, step numbers (S) shown in FIG. 12 are referred to where appropriate.

The polling response procedure executing section 13 determines whether an ST message or an ST-F message is to be transmitted (S61), and if an ST-F message is to be transmitted, a determination is made as to whether or not Step S63 and the succeeding steps have been performed for all PVCs registered with respect to the channel (S62). If any PVC exists with respect to which Step S63 and the succeeding steps are not yet executed, the value of A bit is obtained by a conventional process (S63). The A bit carries a bit value set for each of DLCI links of PVC in UNI and indicative of the status of the corresponding link, and "0" and "1" represent "inactive" and "active," respectively. If the A bit is "0," the channel number of a remote PVC and a remote DLCI number are obtained (S64, S65), and the looping management table 18 is referred to in order to obtain looping detection status corresponding to the remote channel number (S66). If the looping detection status is "looping," reference is further made to the looping permission/nonpermission information management table 19 to obtain a looping permission/nonpermission indication corresponding to the remote channel number and the remote DLCI number (S67, S68). If the looping permission/nonpermission indication thus obtained is "loop permitted," the A bit for the PVC concerned is set to "1" (S69, S70). Then, other editing process for PVC status information elements is performed (S71).

As seen from Steps S69 and S70 described above, if the looping permission/nonpermission indication is "loop permitted," the A bit is set to "1" even while looping is detected. This is because, when looping of a channel is intentionally caused for the purpose of traffic test, a problem arises if the A bit is set to "0," and therefore, the operator sets "loop permitted" as the looping permission/nonpermission indication. In such cases, even while looping is detected, the A bit is set to "1" for the DLCI specified by the operator.

The other editing process for the PVC status information elements is performed (S71) also when it is judged in Step S64 that the A bit is "1," when it is judged in Step S67 that the looping detection status is not "looping," or when it is judged in Step S69 that the looping permission/nonpermission indication is not "loop permitted." If it is judged in Step S61 that an ST message is to be transmitted, or if it is judged in Step S62 that Step S63 and the succeeding steps have been performed for all PVCs, other conventional process is carried out to transmit the ST or ST-F message via the channel (S72).

When "check NG" is set as the recovery information in the format checking section 14 (Step S13 in FIG. 8), the frame receiving section 11 discards the received frame (Step S5 in FIG. 7); in this case, the STEb judges thereafter that no ST message has been received during a predetermined time T391 (e.g., 10 seconds) after the transmission of the SE message, as shown in FIG. 13, and the first detection of abnormality is counted in the polling start procedure. After the predetermined time T391 passes, the next polling timing is reached.

Also in this case, the STEb transmits a frame carrying an SE message [N(S)=a+3; N(R)=b+1] and having the value "1" set in its C/R field to the STEa, as shown in FIG. 13, and if a loop still exists, the frame directly loops back, as indicated at R14 in FIG. 13, and the STEb receives this frame as an SE message transmitted from the STEa. Like the case indicated at R13, the STEb discards the received SE message because the C/R values are the same, and no ST message is created or transmitted.

The ITU-T recommendations X.76 prescribe a detection method wherein an STE which generated an ST message upon receipt of an SE message waits next SE message to arrive for a predetermined time T392 (e.g., 15 seconds), and if no SE message is received, it is judged that a channel error has occurred. The ITU-T recommendations X.76 also prescribe a detection method wherein, when no ST message is received during the predetermined time T391 after the transmission of an SE message, it is judged that a channel error has occurred. According to the present invention, when looping has occurred in a channel, the returned SE message is discarded and is not treated as message reception; therefore, such an error is detected in the polling start procedure and the polling response procedure (part ■ in FIG. 13).

Based on the count of abnormality detection, a final judgment that abnormality has occurred is made. Specifically, according to the ITU-T recommendations X.76, a final judgment as to abnormality is made if the abnormality is detected three times in four consecutive confirmations of link completeness in the polling start or response procedure. When such final judgment is made, the STEb makes notification specifying the DLCI number (DLCIp) in question and the value "0" (inactive) as the A bit to the DTEb in response to an SE-F message transmitted from the DTEb, as shown in FIG. 13. On receiving the notification, the DTEb stops the frame transmission to the DLCIp.

According to the ITU-T recommendations X.76, moreover, it is provided that, when a frame carrying a PVC status confirmation procedure-related message is to be transmitted, the value "0" is set in the C/R field of the frame, and that when such frame is received, the value of the C/R field is ignored. Thus, in cases where STE/DTE pursuant to the existing ITU-T recommendations X.76 and STE/DTE to which the present invention is applied are connected in accordance with two-way PVC status confirmation procedure, the value "1" may be set in the C/R field of a PVC status confirmation procedure-related message when the message is generated by and transmitted from the STE/DTE to which the present invention is applied, whereby looping of channels can be detected on the STE/DTE side to which the present invention is applied. Namely, it is unnecessary to replace all STEs/DTEs in the network with STEs/DTEs to which the present invention is applied, and link completeness confirmation complying with the two-way PVC status confirmation procedure can be made even if STE/DTE pursuant to the existing ITU-T recommendations X.76 and STE/DTE to which the present invention is applied coexist.

When one STE transmits a PVC status confirmation procedure-related message according to the PVC status confirmation procedure, the value "1" is set in the C/R field, and when the other STE transmits a PVC status confirmation procedure-related message, the value "0" is set in the C/R field. However, the position where these values are to be set is not limited to the C/R field and may be some other field. This embodiment uses the C/R field taking account in particular of the fact that the C/R field has significance in user-user communications but is insignificant in the PVC status confirmation procedure.

Further, although the embodiment shown in FIG. 13 illustrates the case where the STEb transmits an SE message after looping occurs, there is a possibility that the STEb transmits an ST message instead after the occurrence of looping. In such cases, when the ST message is received, the value carried in the C/R field of a frame by means of which the ST message has been transmitted is checked, and if the carried value is "1," it is judged that abnormality has occurred in the channel between the STEb and the STEa.

A second embodiment will be now described.

The second embodiment is basically identical in configuration with the first embodiment. Therefore, in the following explanation of the second embodiment, the configuration of the first embodiment will be referred to and only operations different from those of the first embodiment will be described.

Figure 14:
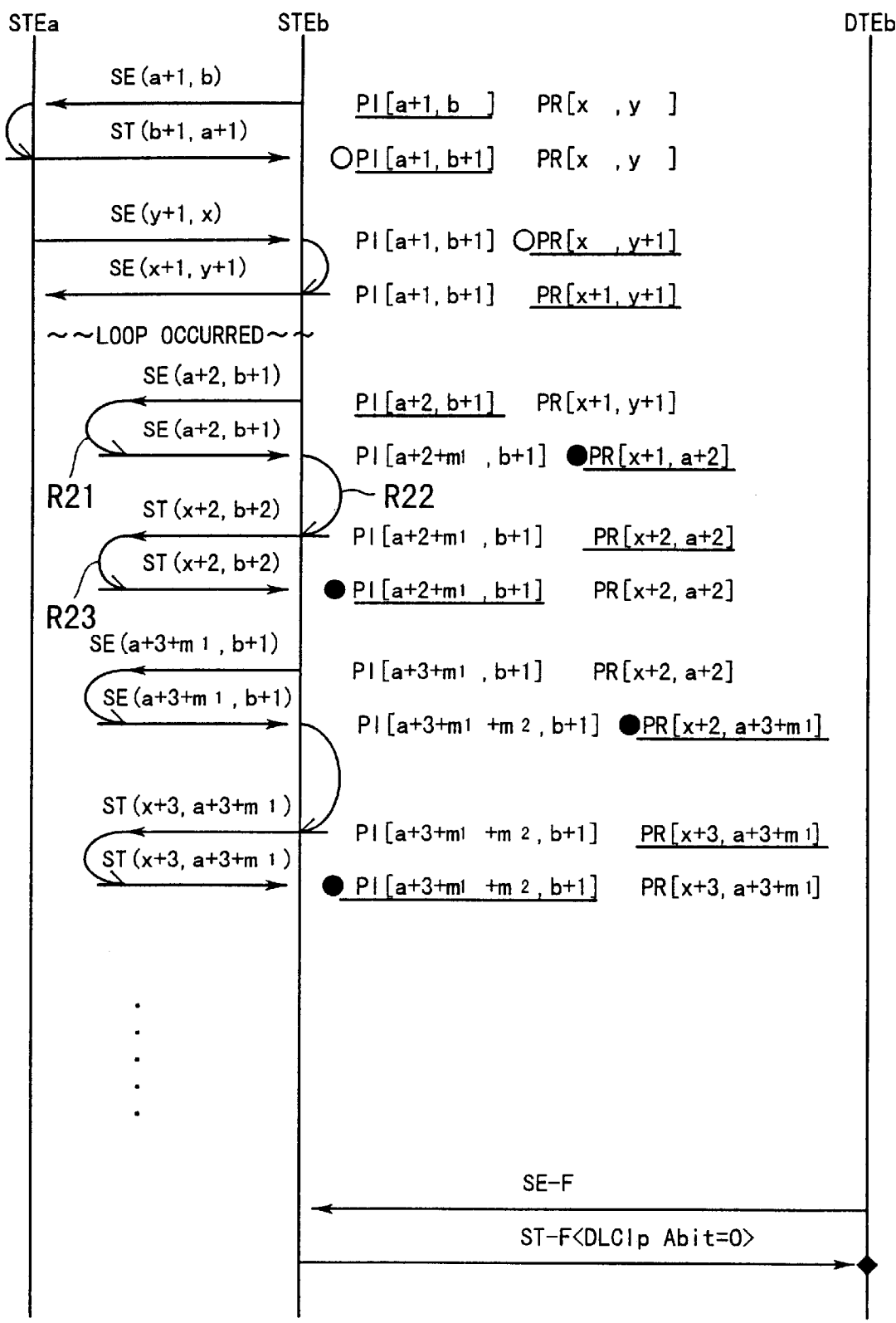
FIG. 14 is a diagram showing a sequence of operations of the node STEb in particular when polling start and response procedures are executed between the nodes STEa, STEb and DTEb according to a second embodiment.
Figure 15:
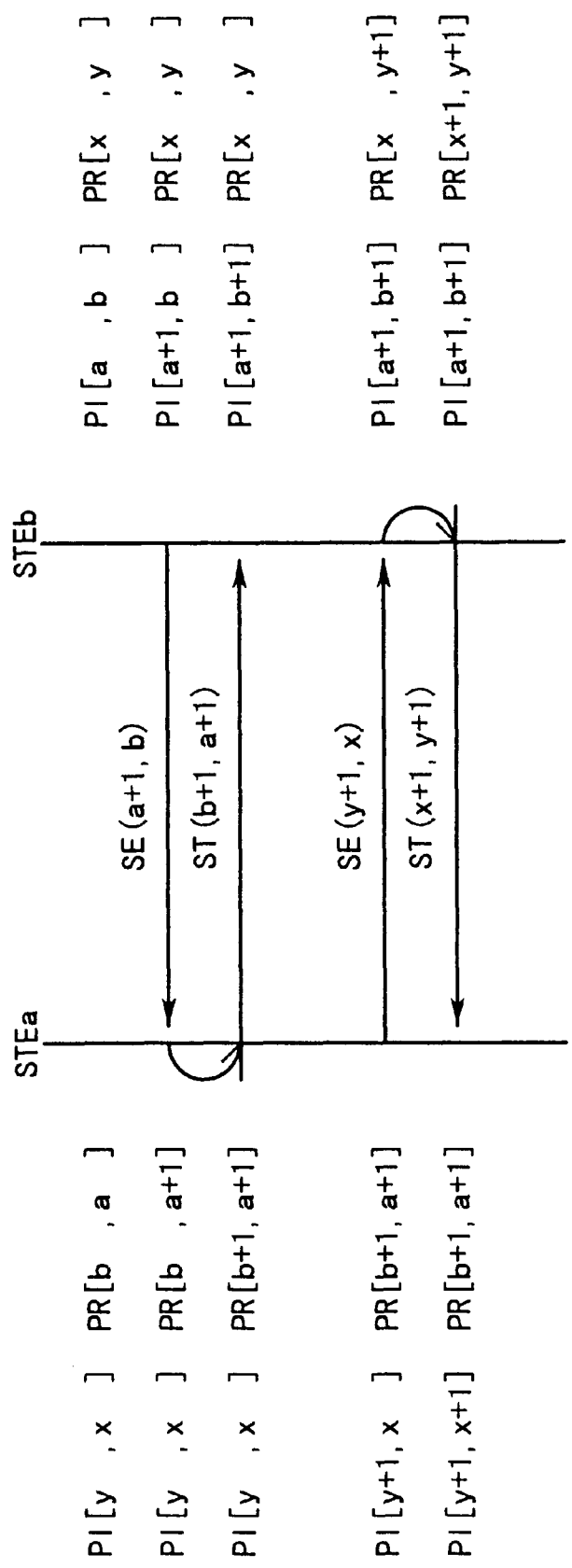
FIG. 15 is a diagram showing conventional polling start and response procedures.

FIG. 14 is a diagram showing a sequence of operations of the node STEb in particular when polling start and response procedures are executed between the nodes STEa, STEb and DTEb according to the second embodiment.

The second embodiment does not use the C/R field, unlike the first embodiment. In FIG. 14, the process performed when no loop exists is identical with the process according to the first embodiment shown in FIG. 13, except for the value setting in the C/R field.

Let it here be assumed that a loop has been created in the channel between the STEa and the STEb. In this case, an SE message [N(S)=a+2; N(R)=b+1] transmitted from the STEb and directed to the STEa, for example, directly loops back as indicated at R21 in FIG. 14, and the STEb receives this message as an SE message transmitted from the STEa. In the STEb, the polling response procedure is started, and the STEb compares the value (b+1) of the sequence number N(R) carried by the SE message with the value (x+1) of the sequence number V(S) in the storage section PR thereof. Further, the STEb compares the individual values of the sequence numbers N(S) and N(R) of the received SE message respectively with the values of the sequence numbers V(S) and V(R) in the storage section PI thereof. If the former set of sequence numbers are found to be identical as a result of the comparison and at the same time the latter set of sequence numbers are found to be different from each other as a result of the comparison, it is judged that there is no abnormality in the channel between the STEa and the STEb; otherwise, it is judged that abnormality has occurred in the channel between the STEa and the STEb.

In the case of R21 shown in FIG. 14, the former set of sequence numbers are not identical while the latter set of sequence numbers are not different from each other; therefore, it is judged that abnormality has occurred in the channel between the STEa and the STEb, and the first detection of abnormality is counted in the polling response procedure.

The STEb thereafter sets the value (a+2) of the sequence number N(S) carried by the SE message in the storage section PR as the sequence number V(R), as indicated at R22 in FIG. 14. Then, the value of the sequence number V(S) in the storage section PR of the STEb, that is, x+1, is read out, and a value (x+2), which is the sum of the read value and the value "1," is set as the sequence number N(S) of an ST message. Also, the value of the sequence number V(R) in the storage section PR, that is, a+2, is read out and set as the sequence number N(R) of the ST message, and the ST message is then transmitted to the STEa. At this time, the sequence number N(S) set in this ST message, that is, x+2, is copied to the storage section PR of the STEb as the sequence number V(S). Further, a random number $m_1$ ($\neq 0$) is added to the value (a+2) of the sequence number V(S) in the storage section PI. The value $m_1$ is not a predetermined fixed value but a random number, and this prevents a remote DTE/STE from operating erroneously when the remote DTE/STE operates based on identical logic.

If the loop of the channel between the STEa and the STEb remains unremoved thereafter, the ST message [N(S)=x+2; N(R)=a+2] transmitted from the STEb and directed to the STEa directly loops back, as indicated at R23 in FIG. 14, and the STEb receives this message as an ST message transmitted from the STEa. The polling start procedure is then started in the STEb, and the STEb compares the value (a+2) of the sequence number N(R) carried by the ST message with the value (a+2+$m_1$) of the sequence number V(S) in the storage section PI thereof in the same manner as known in the art. In this comparison, according to the conventional procedure, the two sequence numbers take the same value (a+2) as indicated at R3 in FIG. 16 and thus it is judged that there is no abnormality; however, according to the present invention, the two sequence numbers differ from each other, and accordingly, the STEb judges for the first time in the polling start procedure that there is abnormality in the channel between the STEa and the STEb.

If the looping of the channel between the STEa and the STEb remains unremoved thereafter, a process identical with the process R21–R23 shown in FIG. 14 is repeated.

Then, if abnormality is detected three times in four consecutive confirmations of link completeness in the polling start or response procedure according to the ITU-T recommendations X.76, for example, a final judgment as to abnormality that looping of the channel has occurred is made, as in the first embodiment.

Instead of this method of making the final judgment, a method may be employed in which a final judgment that looping of a channel has occurred is made when abnormality is detected a predetermined number of times, a, consecutively. Namely, where default values (predetermined value T391=10 seconds; predetermined value T392=15 seconds; final judgment is made in accordance with whether or not abnormality is detected three times in four consecutive confirmations) pursuant to the ITU-T recommendations X.76 are employed, it takes about 40 seconds (=10 seconds×4 confirmations) for the polling start procedure or about 60 seconds (=15 seconds×4 confirmations) for the polling response procedure to make a final judgment as to abnormality. According to the above method of making the final judgment, the time period necessary for the looping detection can be reduced approximately by half where a=2. This method of making the final judgment can be applied to the first embodiment.

According to this method, if, after the occurrence of abnormality is finally judged, normal state is detected a predetermined number of times, b, consecutively, it is judged that the channel has recovered from looping.

As described above, according to the present invention, when a status enquiry message and a status response message according to the two-way PVC status confirmation procedure are exchanged between two nodes, a signal identifying the source of transmission of such a message is carried at a predetermined position of a frame by means of which the message is transmitted. Thus, when looping of a channel has occurred, such channel looping can be detected without fail at all times, though according to the conventional procedure, the channel looping fails to be detected at the time of the second or subsequent detection.

Further, either of two nodes, between which a status enquiry message and a status response message are exchanged according to the two-way PVC status confirmation procedure, detects abnormality upon receipt of a message which is identical in content with the status enquiry message it transmitted, and adds a random number to the value of the sequence number V(S) in the storage section PI thereof. Consequently, when looping of a channel has occurred, such channel looping can be detected without fail at all times, though according to the conventional procedure, the channel looping fails to be detected at the time of the second or subsequent detection.

Furthermore, the looping permission/nonpermission information management table is provided so that a loop set for the purpose of traffic test may not be treated as a subject of abnormality detection. This prevents transmission of user frames from being adversely affected while a loop is set for the purpose of traffic test.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A looping detection apparatus for a communications system in which a node transmits a status enquiry message to a remote node and, when a status enquiry message is received from the remote node, sends back a status response message, to thereby confirm whether normal communication status is established with the remote node, comprising:

status enquiry message transmitting means provided in a first node, for transmitting a status enquiry message to a second node with a first identification code carried at a predetermined position of a signal by means of which the status enquiry message is transmitted;

status response message returning means provided in the second node, for creating a status response message based on the status enquiry message upon receipt of the status enquiry message, and sending the status response message back to the first node with a second identification code carried at the predetermined position in place of the first identification code; and judging means provided in the first node, for checking an identification code carried at the predetermined position of a signal by means of which a status enquiry message has been transmitted when the status enquiry message is received, and judging that abnormality has occurred in communication status between the second and local nodes if the signal carries the first identification code.

2. The looping detection apparatus according to claim 1, wherein said communications system employs a frame-relay communication technique and a two-way PVC (permanent virtual circuit) status confirmation procedure, and said predetermined position is a command/response indication bit position provided in a header of a frame by means of which a message relating to the PVC status confirmation procedure is transmitted.

3. The looping detection apparatus according to claim 2, wherein said first identification code is a value of 1 and said second identification code is a value of 0.

4. The looping detection apparatus according to claim 1, wherein abnormality in the communication status determined by said judging means comprises looping of a channel.

5. The looping detection apparatus according to claim 4, wherein said judging means judges that there is no looping occurring in the channel between the second node and the local node if the code carried at the predetermined position of the signal by means of which the received status enquiry message has been transmitted is the second identification code.

6. The looping detection apparatus according to claim 1, further comprising second node-side status enquiry message transmitting means provided in the second node, for transmitting a status enquiry message to the first node with the second identification code carried at the predetermined position of a signal by means of which the status enquiry message is transmitted;

first node-side status response message returning means provided in the first node, for creating a status response message based on the status enquiry message upon receipt of same, and sending the status response message back to the second node with the first identification code carried at the predetermined position in place of the second identification code; and second node-side judging means provided in the second node, for checking the identification code carried at the predetermined position of a signal by means of which a status enquiry message has been transmitted when the status enquiry message is received, and judging that abnormality has occurred in communication status between the first and local nodes if the signal carries the second identification code.

7. The looping detection apparatus according to claim 1, further comprising response message receiving/judging means provided in the first node, for checking the identification code carried at the predetermined position of a signal by means of which a status response message has been transmitted when the status response message is received, and judging that abnormality has occurred in communication status between the second node and the local node if the signal carries the first identification code.

8. The looping detection apparatus according to claim 1, further comprising discarding means provided in the first node, for discarding the received status enquiry message when it is judged by said judging means that abnormality has occurred in the communication status.

9. The looping detection apparatus according to claim 1, wherein said judging means makes a final judgment that abnormality has occurred in the communication status when the abnormality is detected a plurality of times and the plural detection fulfills a predetermined condition, and makes a final judgment that there is no abnormality in the communication status and restarts detection when the plural detection does not fulfill the predetermined condition.

10. The looping detection apparatus according to claim 9, further comprising storing means provided in the first node, for storing the final judgment made by said judging means; and notifying means provided in the first node, for notifying an operator of a warning message that the communication status between the first and second nodes has undergone a normality-to-abnormality transition if a final judgment that abnormality has occurred in the communication status is made by said judging means and if a previous final judgment made by said judging means and stored in said storing means indicates non-abnormality.

11. The looping detection apparatus according to claim 9, further comprising storing means provided in the first node, for storing the final judgment made by said judging means; and notifying means provided in the first node, for notifying an operator of a warning message that the communication status between the first and second nodes has undergone an abnormality-to-normality transition if a final judgment that there is no abnormality in the communication status is made by said judging means and if a previous final judgment made by said judging means and stored in said storing means indicates abnormality.

12. The looping detection apparatus according to claim 9, further comprising inhibiting means provided in the first node, for inhibiting a user frame from being transmitted via a channel between the first and second nodes when a final judgment that abnormality has occurred in the communication status is made by said judging means.

13. The looping detection apparatus according to claim 9, further comprising receiving means for receiving a designation signal input from outside and designating a channel and a DLCI (data link connection identifier); and revoking means for revoking a final judgment of said judging means that abnormality has occurred in the communication status when the final judgment is made by said judging means but a channel and a DLCI with respect to which the final judgment is made are the channel and the DLCI designated by the designation signal received by said receiving means.

14. A looping detection apparatus for a communications system in which a node transmits a status enquiry message to a remote node and, when a status enquiry message is received from the remote node, sends back a status response message, to thereby confirm whether normal communication status is established with the remote node, comprising:

status enquiry message transmitting means for transmitting a status enquiry message to a remote node with first and second values carried at first and second predetermined positions, respectively, of the status enquiry message, said status enquiry message transmitting means having a first storage section for storing the first and second values and a second storage section for storing third and fourth values;

first reading means for reading out the values carried at the first and second predetermined positions of a status enquiry message when the status enquiry message is received;

first judging means for comparing the two values read out by said first reading means with corresponding ones of the two values stored in the first storage section and judging that abnormality has occurred in communication status between the remote and local nodes if the former two values coincide with the corresponding ones of the latter two values;

first storage instructing means for causing the second storage section to store, as a fifth value in place of the fourth value, the value carried at the first predetermined position of the received status enquiry message when a judgment that abnormality has occurred in the communication status is made by said first judging means;

status response message transmitting means for transmitting a status response message to the remote node, the status response message having a third predetermined position carrying a sixth value obtained by adding a value of 1 to the third value stored in the second storage section and a fourth predetermined position carrying the fifth value stored in the second storage section;

second storage instructing means for causing the second storage section to store, in place of the third value, the value carried at the third predetermined position of the status response message transmitted by said status response message transmitting means; and third storage instructing means for causing the first storage section to store, in place of the first value, a seventh value obtained by adding a predetermined value to the first value stored therein.

15. The looping detection apparatus according to claim 14, further comprising second reading means for reading out the value carried at the fourth predetermined position of a status response message when the status response message is received; and second judging means for comparing the value read out by said second reading means with the seventh value stored in the first storage section and judging that abnormality has occurred in the communication status between the remote node and the local node if the two values differ from each other.

16. The looping detection apparatus according to claim 15, wherein said predetermined value added to obtain the seventh value is a random number.

17. The looping detection apparatus according to claim 15, further comprising final judgment making means for finally judging that looping has occurred in a channel when the number of times a judgment that abnormality has occurred in the communication status is consecutively made by said first and second judging means has reached a first predetermined number.

18. The looping detection apparatus according to claim 17, further comprising recovery judging means for judging that the channel has recovered from looping when the number of times a judgment that there is no abnormality in the communication status is consecutively made by said first and second judging means has reached a second predetermined number after the judgment that looping has occurred in the channel was made by said final judgment making means.

\* \* \* \* \*